(12) United States Patent
Sindambiwe

(10) Patent No.: US 7,739,146 B2
(45) Date of Patent: Jun. 15, 2010

(54) HANDLING TAXES IN COMPUTER-BASED SALES TRANSACTIONS

(75) Inventor: Eugene Sindambiwe, Eppelheim (DE)

(73) Assignee: SAP Aktiengesellschaft, Walldorf (DE)

( * ) Notice: Subject to any disclaimer, the term of this patent is extended or adjusted under 35 U.S.C. 154(b) by 1179 days.

(21) Appl. No.: 10/941,654

(22) Filed: Sep. 14, 2004

(65) Prior Publication Data
US 2006/0085305 A1 Apr. 20, 2006

(51) Int. Cl.
G06Q 20/00 (2006.01)
G06F 17/22 (2006.01)
(52) U.S. Cl. .......................................... 705/19; 705/31
(58) Field of Classification Search .................. 705/19, 705/31
See application file for complete search history.

(56) References Cited
U.S. PATENT DOCUMENTS
6,983,261 B1 * 1/2006 Francisco et al. ............. 705/39

| 2003/0040972 | A1 * | 2/2003 | Ryan et al. ..................... 705/26 |
| 2003/0040992 | A1 | 2/2003 | Ryan, Jr. et al. |
| 2003/0101111 | A1 * | 5/2003 | Dang et al. ..................... 705/31 |
| 2004/0002906 | A1 * | 1/2004 | Von Drehnen et al. ........ 705/31 |
| 2004/0103305 | A1 | 5/2004 | Ginter et al. |
| 2004/0123129 | A1 | 6/2004 | Ginter et al. |

* cited by examiner

Primary Examiner—F. Ryan Zeender
Assistant Examiner—Faris Almatrahi
(74) Attorney, Agent, or Firm—Fish & Richardson P.C.

(57) ABSTRACT

Methods and apparatus, including computer program products, implementing techniques for handling taxes in computer-based sales transactions. In a sales transaction, a buyer makes a purchase from a seller. The purchase has a purchase price and a tax amount owed on the purchase. In one aspect, the techniques include using a tax handling proxy to identify a tax calculation service for a sales transaction and to interact with the identified tax calculation service to obtain the tax amount for the sales transaction. The tax calculation service is provided by a governmental tax authority. In another aspect, the techniques include transferring payment for a tax amount from the buyer to the governmental tax authority without passing through the seller. The payment for the tax amount is transferred contemporaneously with a transfer of a payment for the purchase price to the seller.

18 Claims, 4 Drawing Sheets

| PURCHASER'S GEOGRAPHICAL LOCATION | VENDOR'S GEOGRAPHICAL LOCATION | GEOGRAPHICAL LOCATION WHERE PURCHASER PAYS TAXES | ... | TAX CALCULATION SERVICES TO CONSULT |
|---|---|---|---|---|
| A | B | - | ... | α |
| X | - | Y | ... | β, γ |
| ⋮ | ⋮ | ⋮ | ⋮ | ⋮ |

FIG. 2 though not all of the tax handling tasks are performed by a tax handling proxy rather than being performed by the sales system itself. A tax handling proxy in accordance with the invention is responsible for:

HANDLING TAXES IN COMPUTER-BASED SALES TRANSACTIONS

BACKGROUND

The present invention relates to data processing by digital computer, and more particularly to handling taxes in computer-based sales transactions.

A typical sales transaction includes a buyer and a seller. The seller sells goods and/or services to the buyer, and the buyer pays a purchase price to the seller for the goods and/or services. In addition, taxes are typically paid in connection with the sales transaction.

Tax handling is one of the tasks performed when processing a sales transaction. The amount and nature of tax owed can depend on a number of properties of the sales transaction, including the geographical location of the buyer, the geographical location of the seller, the geographical location where the buyer pays taxes, the geographical location where the product will be used, the nature of the product, the nature of the buyer, and so on. Therefore, handling taxes can be problematic for sales system vendors, who have to implement complicated mechanisms in their sales systems to account for the many different circumstances and types of sales transactions (i.e., sales transactions with different properties).

SUMMARY OF THE INVENTION

The present invention provides methods and apparatus, including computer program products, that implement techniques for handling taxes in computer-based sales transactions. In a sales transaction, a buyer makes a purchase from a seller. The purchase has a purchase price and a tax amount owed on the purchase.

In general, in one aspect, the techniques include using a tax handling proxy to identify a tax calculation service for a sales transaction and to interact with the identified tax calculation service to obtain the tax amount. The tax calculation service is provided by a governmental tax authority.

Implementations of the invention can include one or more of the following features.

To identify a tax calculation service for a sales transaction includes to identify a tax calculation service based on one or more properties of the sales transaction. The one or more properties of the sales transaction include one or more of: geographical location of the buyer, geographical location of the seller, geographical location where the buyer pays taxes, geographical location where the product will be used, nature of the product, and nature of the buyer. To identify the tax calculation service includes to use a lookup table that maps the one or more properties of the sales transaction to one or more tax calculation services. To interact with the identified tax calculation service includes to interact with the identified tax calculation service through a Web services interface.

In general, in another aspect, the techniques include transferring payment for a tax amount from a buyer to a governmental tax authority without passing through a seller. The payment for the tax amount is transferred contemporaneously with a transfer of a payment for the purchase price to the seller.

Implementations of the invention can include one or more of the following features.

Transferring payment for the tax from the buyer includes transferring payment for the tax from a payment agent of the buyer.

In general, in another aspect, the present invention provides a system that includes a download portal and a tax handling proxy for handling taxes for a sales transaction in which a buyer makes a purchase of downloadable software from a seller through the download portal. The tax handling proxy does not calculate the tax amount but instead obtains the tax amount from a tax calculation service provided by a governmental tax authority, and transfers payment for the tax amount from the buyer to the governmental tax authority without passing through the seller. The payment for the tax amount is transferred contemporaneously with a transfer to the seller in connection with the sales transaction.

Implementations of the invention can include one or more of the following features.

The tax handling proxy identifies the tax calculation service for the sales transaction based on one or more properties of the sales transaction. The one or more properties of the sales transaction include one or more of: geographical location of the buyer, geographical location of the seller, geographical location where the buyer pays taxes, geographical location where the product will be used, nature of the product, and nature of the buyer. The tax handling proxy identifies the tax calculation service using a lookup table that maps the one or more properties of the sales transaction to one or more tax calculation services. The tax handling proxy interacts with the identified tax calculation services through a Web services interface. Transferring payment for the tax from the buyer includes transferring payment for the tax from a payment agent of the buyer.

The invention can be implemented to realize one or more of the following advantages. The tasks of tax calculation and tax collection are substantially taken out of the seller's sales system. The sellers no longer have the burden of knowing and implementing the tax calculation logic and forwarding the taxes owed to the governmental tax authorities. The governmental tax authorities can regulate the tax calculation and collection. For example, they can monitor sales transactions and arrange for the tax payment to be transferred directly to them as soon as the transaction occurs. The purchasers can be assured that they are treated uniformly because the same tax calculation logic is being used. One implementation of the invention provides all of the above advantages.

Details of one or more implementations of the invention are set forth in the accompanying drawings and in the description below. Further features, aspects, and advantages of the invention will become apparent from the description, the drawings, and the claims.

BRIEF DESCRIPTION OF THE DRAWINGS

FIG. 2 shows a lookup table used to identify tax calculation services for a sales transaction.

Like reference numbers and designations in the various drawings indicate like elements.

DETAILED DESCRIPTION

Conventional sales systems include one or more modules for handling taxes, in particular, for calculating the amount of taxes owed to one or more tax authorities for a sales transaction. In a sales system in accordance with the invention, much of this functionality is provided through a tax handling proxy that interacts with tax calculation services, as will be described.

Figure 1A:
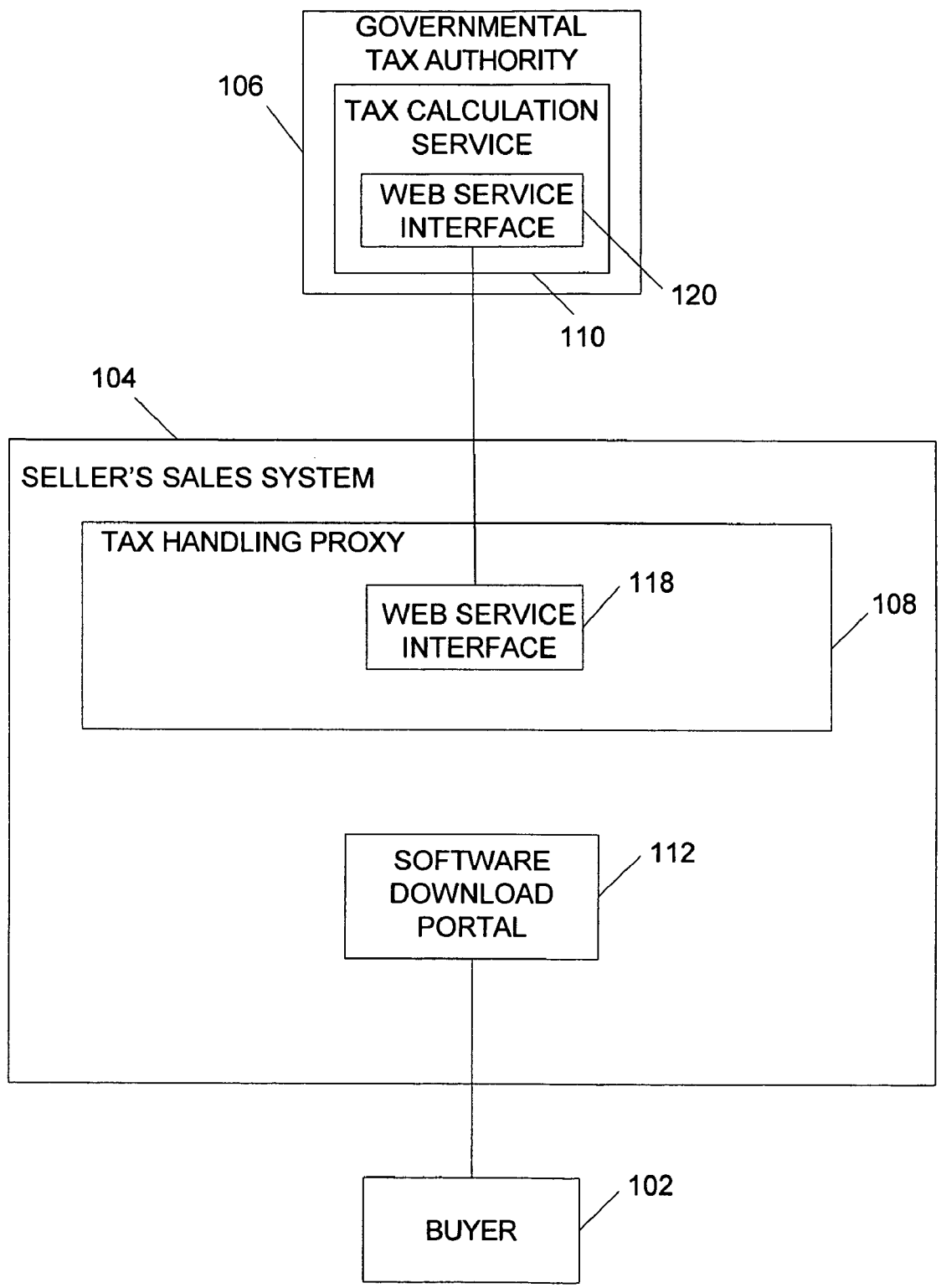
FIG. 1A is a block diagram of a sales system according to one implementation.

FIG. 1A shows a sales system 104 of a seller selling downloadable software. The sales system 104 includes a software download portal 112 through which a buyer 102 makes a purchase (i.e., requests a software download, supplies billing information, and so on) during a sales transaction. The system further includes a tax handling proxy 108, which handles taxes for the sales transaction through interaction with an external tax calculation service 110. The tax handling proxy is a proxy in a sense that it only serves as an intermediary between the sales system 104 and the tax calculation service 110, but does not perform tax calculation itself. The tax calculation is instead performed by the tax calculation service 110, which is provided by a governmental tax authority 106.

Figure 1B:
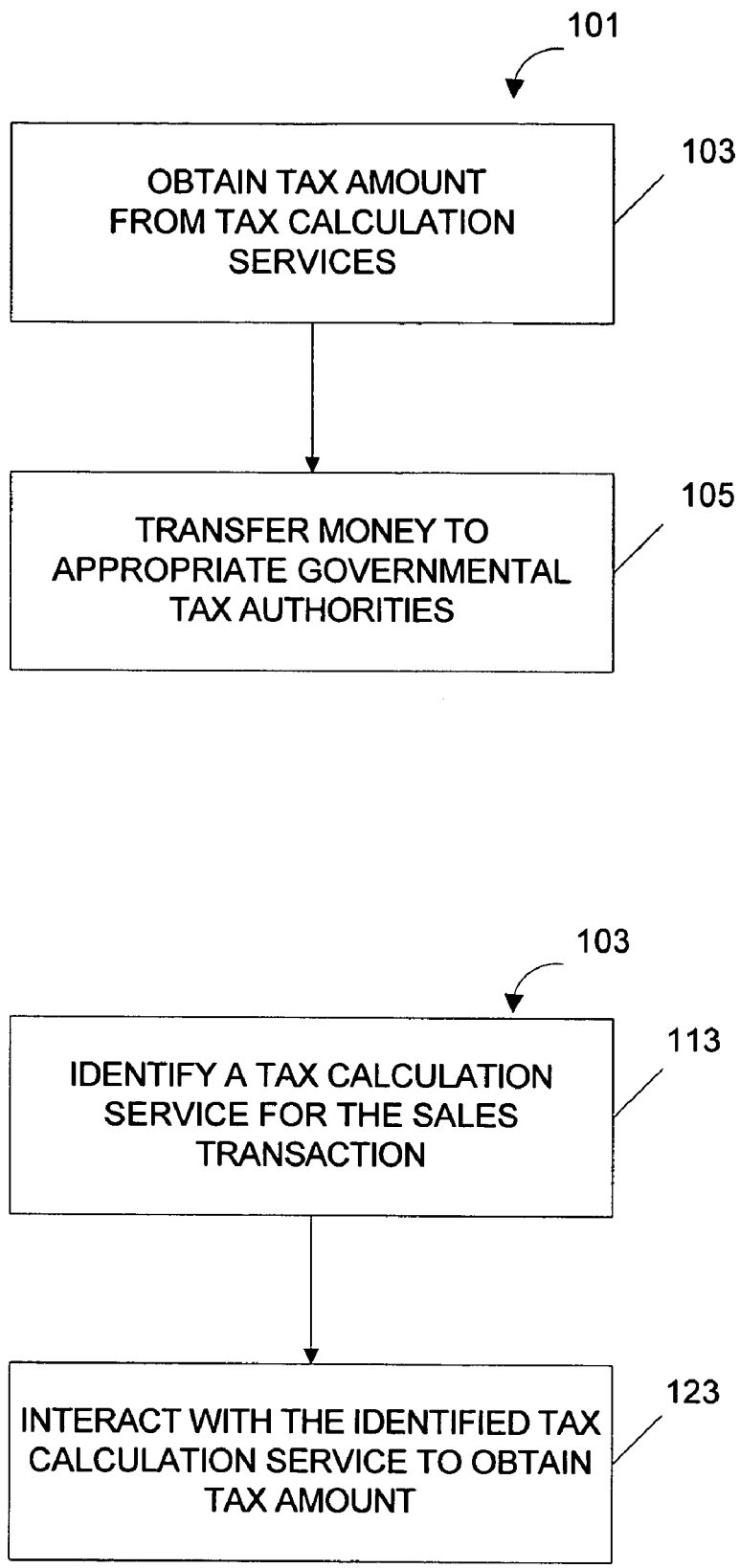
FIG. 1B is a flowchart illustrating a process for handling taxes during a sales transaction.

FIG. 1B shows a process 101 according to which taxes are handled for a sales transaction. The tax handling proxy obtains the amount of taxes that is owed for the sales transaction from one or more tax calculation services (step 103), which are provided by one or more governmental tax authorities. Subsequently, the payment for taxes is transferred to the appropriate governmental tax authorities (step 105).

In order to obtain the amount of tax that is owed for the sales transaction (step 103), the tax handling proxy first identifies one or more tax calculation services that need to be consulted (step 113). The tax calculation services are identified based on the properties of the sales transaction. In one implementation, the tax handling proxy uses a lookup table to perform this identification. One such lookup table 202 is shown in FIG. 2. As shown, each row of the lookup table maps a set of sales transaction properties 204 to a set of tax calculation services 206. Thus, for a sales transaction with a set of properties listed in a particular row of the lookup table 202, the tax handling proxy identifies tax calculation services listed in that particular row as the tax calculation services to consult for the sales transaction.

As illustrated in FIG. 1B, once tax calculation services are identified, the tax handling proxy interacts with the identified tax calculation services to obtain the amount of taxes due for the sales transaction (step 123). In one implementation, the tax handling proxy sends the sales transaction properties to the identified tax calculation services. In response, the tax calculation services returns to the tax handling proxy the amount of taxes owed according to the sales transaction properties. For instance, a given tax calculation service can return to the tax handling proxy the amount of tax owed to the governmental tax authority that provides the given tax calculation service.

The interaction between the tax handling proxy and tax calculation services can be facilitated in a variety of ways. In one implementation, a Web services interface 118, 120 is Web services standards, such as Simple Object Access Protocol (SOAP) and Web Service Definition Language (WSDL). Using these standards, the tax handling proxy and the tax calculation services can exchange of data independently of their execution platforms.

Figure 3:
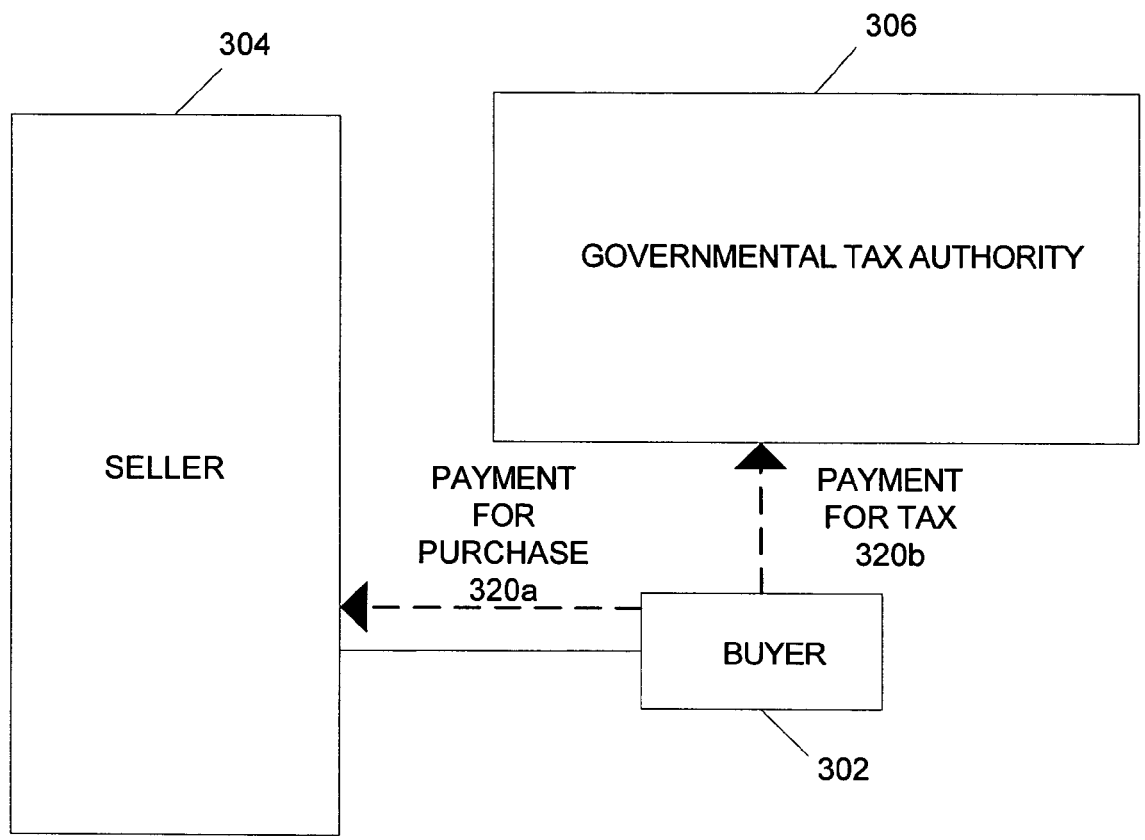
FIG. 3 is a block diagram illustrating how money is transferred during a sales transaction.

As illustrated in FIG. 1B, once the tax handling proxy obtains the amount of taxes that is owed for a sales transaction, and the purchase is made, the payment for taxes is transferred from the buyer to appropriate governmental tax authorities (step 105). The payment for taxes can be transferred separately from the payment for the purchase. For example, as shown in FIG. 3, the payment 320b for the taxes can be transferred directly to the governmental tax authority 306 without passing through the seller 304. The payment 320a for the purchase can be transferred to the seller 304 separately. These can be made directly by the buyer or alternatively, they can be made by an agent of the buyer (e.g., the buyer's bank or credit card company). These payments can occur contemporaneously with the sales transaction.

In one implementation, the tax handling proxy can monitor a sales transaction on behalf of a governmental tax authority. The tax handling proxy can notify a governmental tax authority when a sales transaction takes place. The governmental tax authority that is notified can be the same authority that is consulted for the tax calculation or it can be a different authority. The tax handling proxy can provide notification to more than one governmental tax authority.

The above-described tasks can be performed by a single tax handling proxy, or alternatively, by multiple proxies, each proxy performing a subset of the tasks. For example, multiple proxies can include one proxy to provide monitoring on behalf of one governmental tax authority and another proxy to provide monitoring on behalf of another governmental tax authority. Each proxy can be implemented as a replaceable software module (e.g., a software plug-in) that allows the proxy to be installed and removed independently of other proxies.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described herein, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular implementations, but other implementations are within the scope of the following claims. For example, the logic based on which the tax handling proxy identifies tax calculation services that need to be consulted does not have to be stored in a lookup table. As one example, the logic can be hard coded within the tax handling proxy in an if-then statement.

Also, although downloadable software has been used as an example of a product that a buyer purchases from a seller, the system described is not limited to downloadable software, but can be used with other products, for example, downloadable books or music, or physical, non-downloadable goods. Furthermore, the system described is not limited to tax calculation and can be used to have other tasks (e.g., shipping charges calculation) be performed by external entities. In certain implementations, multitasking and parallel processing can be used. For example, in one implementation, grid computing can be used to implement a single tax calculation service as a grid of multiple services, each with similar functionality. The tax amount can be determined at the level of the grid as a whole. Other implementations are within the scope of the following claims.

What is claimed is:

1. A machine-readable storage device encoded with a computer program product that is operable to cause data processing apparatus to perform operations comprising:
   handling taxes for a sales transaction in which a buyer makes a purchase from a seller, the purchase having a purchase price and a tax amount owed on the purchase, wherein handling taxes for a sales transaction includes using a tax handling proxy to:
      identify a remote, third party tax calculation service for the sales transaction from a plurality of available tax calculation services, the remote, third party tax calculation service being provided by a governmental tax authority;
      transfer sales transaction properties to the remote, third party tax calculation service;
      receive an indication of the tax amount from the remote tax calculation service; and
      transfer payment for the tax amount from the buyer to the governmental tax authority without passing through the seller to prevent access to the payment by the seller, the transfer to the governmental tax authority commencing as soon as the sales transaction occurs and being contemporaneous with transferring a payment for the purchase price to the seller,
   wherein the tax handling proxy is resident in a sales system of the seller and functions as an intermediary between the sales system and the remote tax calculation service.

2. The machine-readable storage device of claim 1, wherein identifying a remote, third party tax calculation service for the sales transaction includes identifying based on one or more properties of the sales transaction.

3. The machine-readable storage device of claim 2, wherein the one or more properties of the sales transaction include one or more of:
   geographical location of the buyer;
   geographical location of the seller;
   geographical location where the buyer pays taxes; and
   geographical location where the product will be used.

4. The machine-readable storage device of claim 2, wherein identifying the remote, third party tax calculation service includes to use a lookup table that maps the one or more properties of the sales transaction to one or more remote, third party tax calculation services.

5. The machine-readable storage device of claim 1, wherein interacting with the remote, third party tax calculation service includes interacting through a Web services interface.

6. The computer program product of claim 1, wherein the tax handling proxy only serves as an intermediary between a sales system and the remote, third party tax calculation service that calculates the tax amount.

7. A system comprising:
   a download portal; and
   a tax handling proxy configured for handling taxes for a sales transaction in which a buyer makes a purchase of downloadable software from a seller through the download portal, the purchase having a purchase price and a tax amount owed on the purchase, wherein the tax handling proxy is resident in a sales system of the seller, functions as an intermediary between the sales system and the remote tax calculation service, and:
      identifies a remote, third party tax calculation service provided by a governmental tax authority for the sales transaction from a plurality of available tax calculation services;
      transfers sales transaction properties to the remote, third party tax calculation service;
      receives an indication of the tax amount from the remote, third party tax calculation service; and
      transfers payment for the tax amount from the buyer to the governmental tax authority without passing through the seller to prevent access to the payment by the seller, and contemporaneously transfers a payment for the purchase price to the seller in connection with the sales transaction, the transfer to the governmental tax authority commencing as soon as the sales transaction occurs.

8. The system of claim 7, wherein the tax handling proxy identifies the tax calculation service for the sales transaction based on one or more properties of the sales transaction.

9. The system of claim 8, wherein the one or more properties of the sales transaction include one or more of:

geographical location of the buyer;
geographical location of the seller;
geographical location where the buyer pays taxes; and
geographical location where the product will be used.

10. The system of claim 8, wherein the tax handling proxy identifies the tax calculation service using a lookup table that maps the one or more properties of the sales transaction to one or more tax calculation services.

11. The system of claim 7, wherein the tax handling proxy interacts with the identified tax calculation services through a Web services interface.

12. The system of claim 7, wherein transferring payment for the tax from the buyer comprises transferring payment for the tax from a payment agent of the buyer.

13. The computer program product of claim 7, the tax handling proxy only serves as an intermediary between a sales system and the remote, third party tax calculation service that calculates the tax amount.

14. A method of handling taxes for a sales transaction in which a buyer makes a purchase from a seller, the purchase having a purchase price and a tax amount owed on the purchase, the method comprising:
   instantiating a tax handling proxy in a sales system of a seller;
   providing a download portal in the sales system through which the buyer can purchase and download software from the seller;
   identifying a remote, third party tax calculation service for the sales transaction from a plurality of available tax calculation services, the remote, third party tax calculation service being provided by a governmental tax authority, the tax handling proxy functioning as an intermediary between the sales system and the remote tax calculation service;
   transferring sales transaction properties to the remote, third party tax calculation service from the tax handling proxy, the tax handling proxy and the remote tax calculation service communicating with each other through respective web interfaces;
   receiving an indication of the tax amount from the remote tax calculation service; and
   transferring payment for the tax amount, via the tax handling proxy web interface, from the buyer to the governmental tax authority without passing through the seller to prevent access to the payment by the seller, the transfer to the governmental tax authority commencing as soon as the sales transaction occurs and being contemporaneous with transferring a payment for the purchase price to the seller.

15. The method of claim 14, wherein transferring payment for the tax from the buyer includes transferring payment for the tax from a payment agent of the buyer.

16. The method of claim 14, wherein identifying a remote, third party tax calculation service for the sales transaction includes to identify based on one or more properties of the sales transaction.

17. The method of claim 15, wherein the one or more properties of the sales transaction include one or more of:
   geographical location of the buyer;
   geographical location of the seller;
   geographical location where the buyer pays taxes; and
   geographical location where the product will be used.

18. The method of claim 14, wherein identifying the remote, third party tax calculation service includes to use a lookup table that maps one or more properties of the sales transaction to one or more remote, third party tax calculation services.

* * * * *